UNITED STATES PATENT OFFICE.

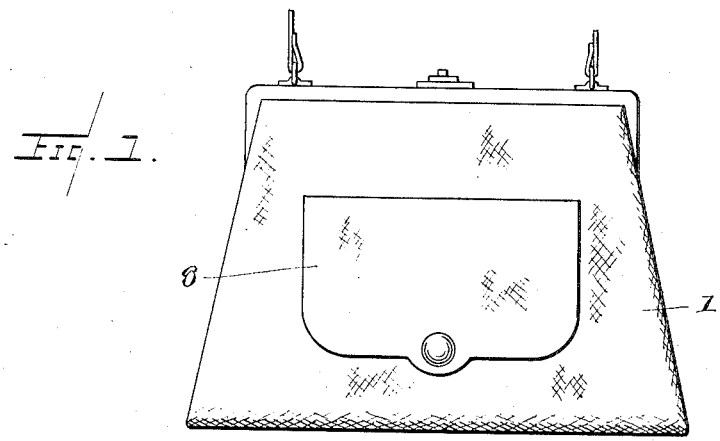
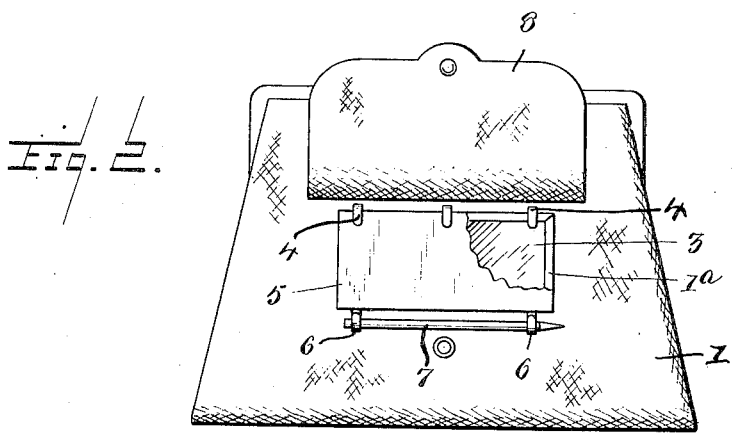
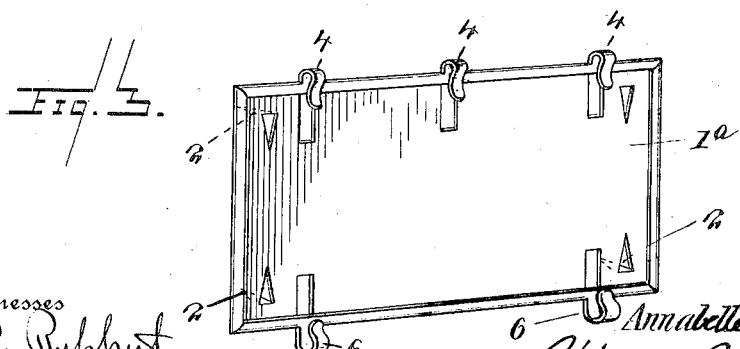

ANNABELLE ROSENDALE, OF GRAND RAPIDS, MICHIGAN.

HAND-BAG.

1,089,268.  Specification of Letters Patent.  Patented Mar. 3, 1914.

Application filed April 26, 1913. Serial No. 763,814.

*To all whom it may concern:*

Be it known that I, Mrs. ANNABELLE ROSENDALE, a citizen of the United States, residing at Grand Rapids, in the county of Kent and State of Michigan, have invented new and useful Improvements in Hand-Bags, of which the following is a specification.

The invention relates to shopping bags, such as generally used by ladies for carrying sundry articles when out walking or shopping, the purpose being to provide such bag with an attachment and embodying a mirror and tablet, the latter being utilized for receiving memoranda and also as a cover for the mirror and affording a pretense for inspection of notes while using the mirror for inspection of the face or head-dress.

The invention provides an attachment embodying a plate which forms a backing or support for the mirror, said plate having the mirror secured thereto in any manner and provided with clips for removably attaching a tablet, and said plate being further provided with loops or holding means for receiving a pencil, pen or like article, the attachment being secured to a side of the bag and normally concealed by means of a flap which is held closed by a suitable fastening, such as commonly employed for fastening gloves.

The invention consists of the novel features, details of construction and combination of parts, which hereinafter will be more particularly set forth, illustrated in the accompanying drawing, and pointed out in the appended claim.

Referring to the drawing, forming a part of the specification, Figure 1 is a side view of a hand bag provided with an attachment embodying the invention. Fig. 2 is a view similar to Fig. 1 with the flap thrown open. Fig. 3 is a detail view of the attachment disassociated from the bag and having the tablet and pencil removed.

Corresponding and like parts are referred to in the following description, and indicated in all the views of the drawing, by the same reference characters.

The numeral 1 designates a hand bag such as generally used by women when shopping or out walking. Upon one side of the bag is located an attachment embodying the invention, said attachment embodying a plate 1ª which is adapted to be secured to a side of the bag in any manner. Teeth 2 form a part of the plate 1ª and are adapted to be passed through a side of the bag and have their inner projecting ends bent so as to hold the plate in position. It is to be understood that the plate may be secured to the bag in any manner. A mirror 3 is supported and attached to the plate 1ª and for this purpose a portion of the plate is bent to overlap an edge portion of the mirror, thereby protecting the edge thereof as well as serving as securing means for fastening the mirror to the plate. Clasps 4 are located along the upper edge of the plate 1ª and preferably form a part thereof. These clasps serve as means for securing a tablet 5 to the plate 1ª, said tablet being designed to receive memoranda and to be removed and replaced by a new one when necessary. Loops 6 are located at the lower edge of the plate 1ª and receive a pencil, pen or like article 7. A flap 8 closes the attachment and affords a protection therefor. This flap is attached to the bag above the plate 1ª and when closed is secured at its lower end by means of a suitable fastening, such as employed in connection with gloves.

The attachment provides for the convenient use of a mirror without attracting attention, since the tablet affords a pretense for inspection of notes when as a matter of fact the mirror is the object of use. The plate 1ª forms a substantial support for the mirror 3 and the latter in turn acts as a back for the tablet.

The invention provides means whereby a mirror, tablet and pencil may be conveniently at hand when required for use.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim appended hereto.

Having thus described the invention what is claimed as new, is:—

In combination with a hand bag, a plate attached to a side thereof and having its edge portions folded to provide a neat finish and means for engaging a mirror, and having portions partly cut therefrom and bent to provide article engaging clips and loops at the edges of the plate, and a flap attached at one edge to the bag and adapted to extend over the plate and provided with means for securing its free edge to the bag beyond the plate.

In testimony whereof I affix my signature in presence of two witnesses.

MRS. ANNABELLE ROSENDALE.

Witnesses:
 HIRAM N. AVERILL,
 ADA C. WARD.